(No Model.)  7 Sheets—Sheet 1.

F. G. & F. H. BATES.
MOTOR ENGINE.

No. 580,445.  Patented Apr. 13, 1897.

WITNESSES:
Fred White
Thomas F. Wallace

INVENTORS:
Francis G. Bates and Frank H. Bates,
By their Attorneys.
Arthur E. Fraser & Co.

(No Model.)
F. G. & F. H. BATES.
MOTOR ENGINE.
No. 580,445.
7 Sheets—Sheet 2.
Patented Apr. 13, 1897.
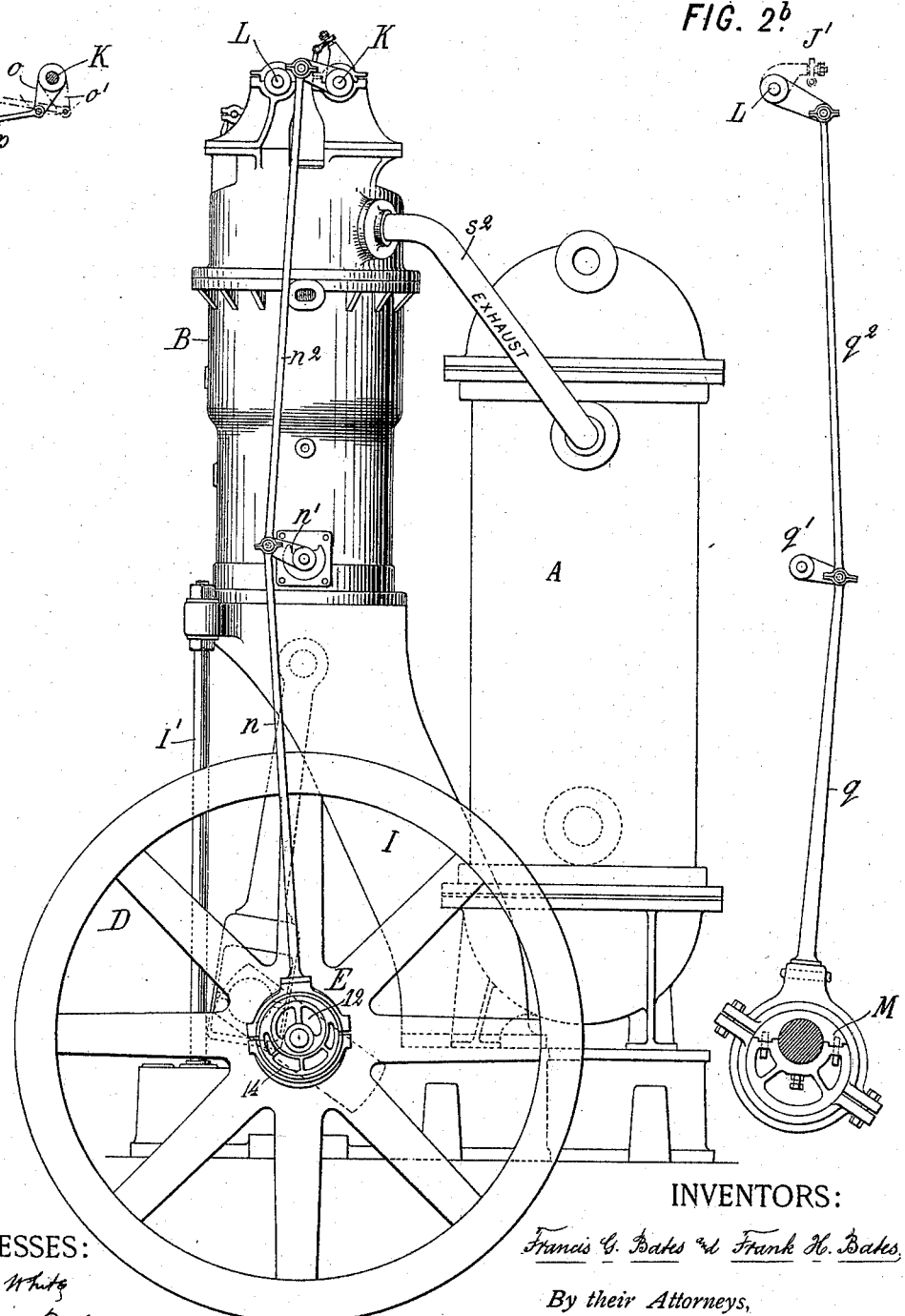
INVENTORS:
Francis G. Bates and Frank H. Bates,
By their Attorneys,
WITNESSES:

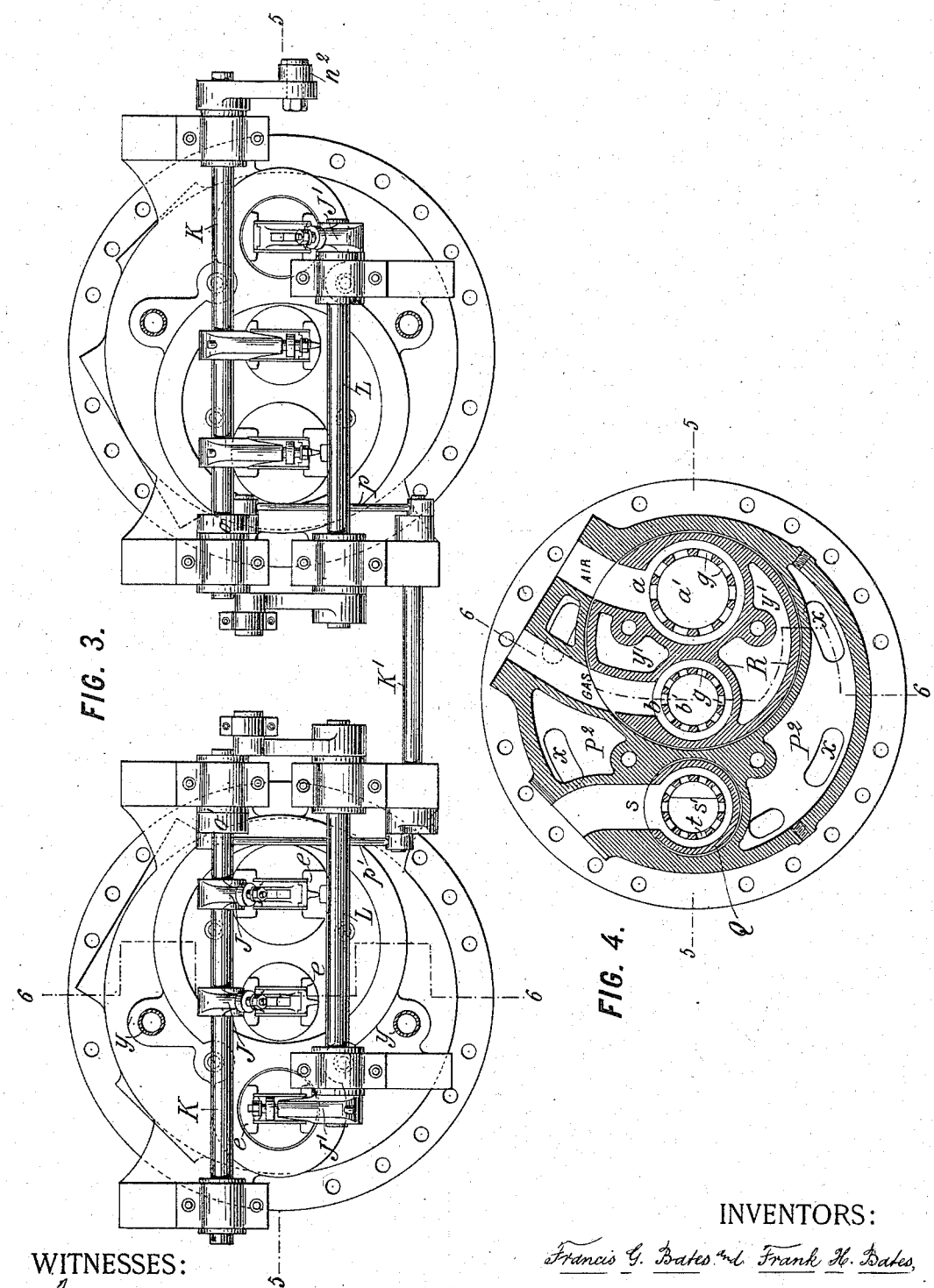

(No Model.)  F. G. & F. H. BATES.  7 Sheets—Sheet 4.
MOTOR ENGINE.
No. 580,445.  Patented Apr. 13, 1897.
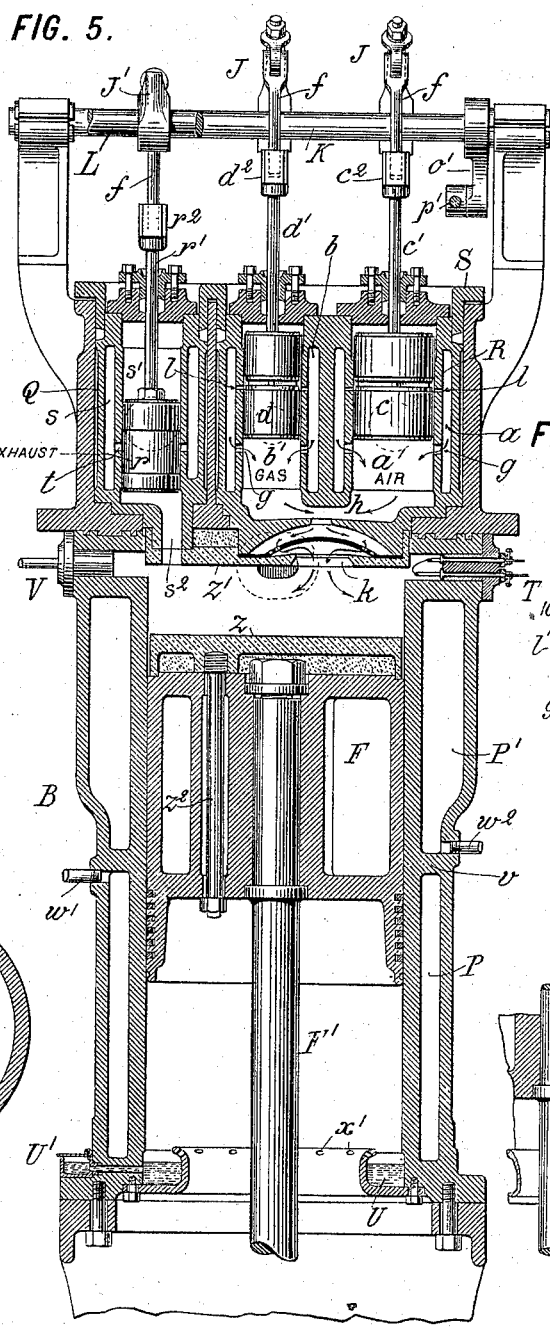
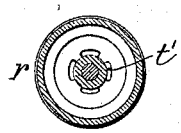
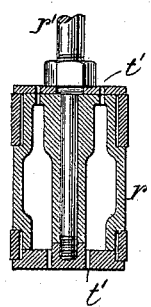
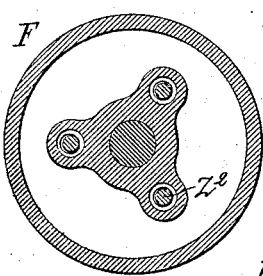
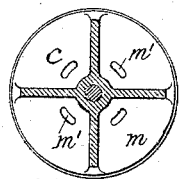
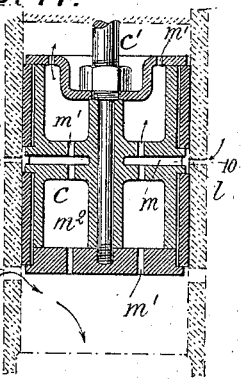
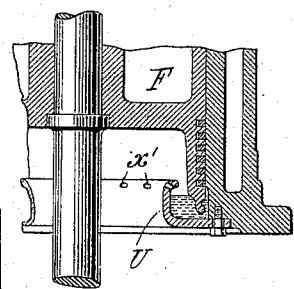
WITNESSES:
Fred White
Thomas F. Wallace
INVENTORS:
Francis G. Bates and Frank H. Bates,
By their Attorneys,
Arthur C. Fraser & Co.

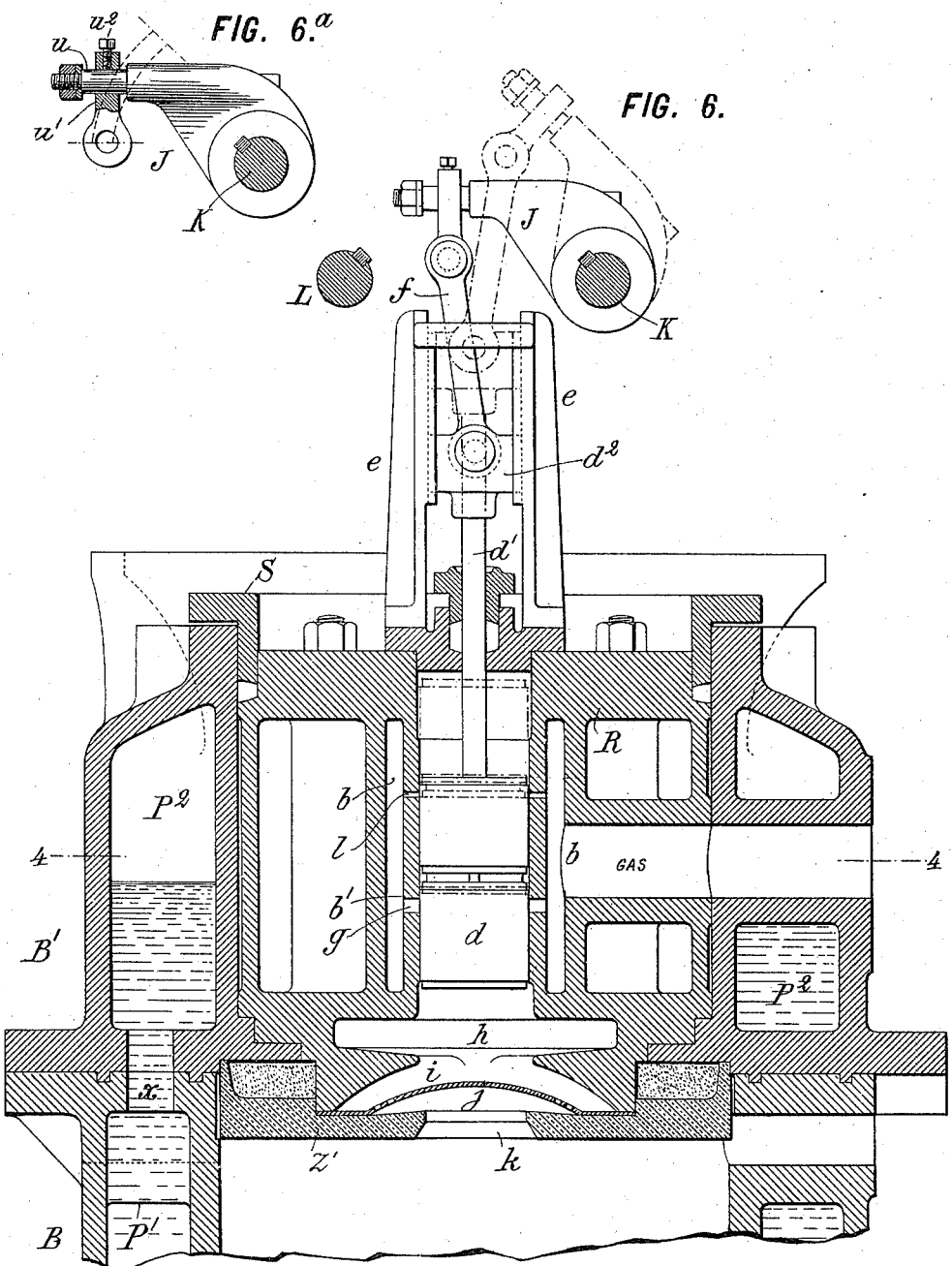

(No Model.)     F. G. & F. H. BATES.     7 Sheets—Sheet 6.
MOTOR ENGINE.

No. 580,445.     Patented Apr. 13, 1897.

WITNESSES:
Fred White
Thomas F. Wallace

INVENTORS:
Francis G. Bates and Frank H. Bates,
By their Attorneys,
Arthur C. Fraser & Co.

(No Model.)
7 Sheets—Sheet 7.
F. G. & F. H. BATES.
MOTOR ENGINE.
No. 580,445. Patented Apr. 13, 1897.
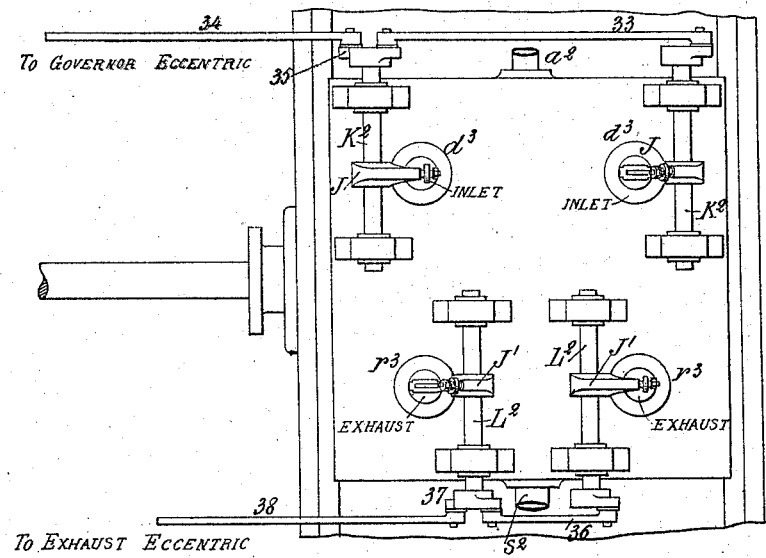
FIG. 14.
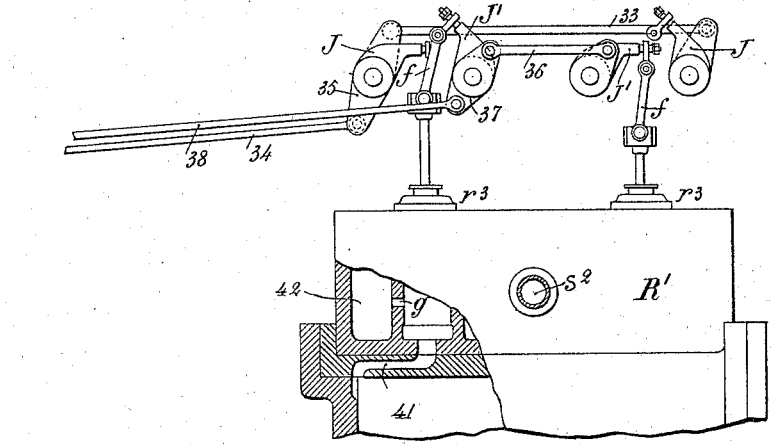
FIG. 15.
FIG. 16.
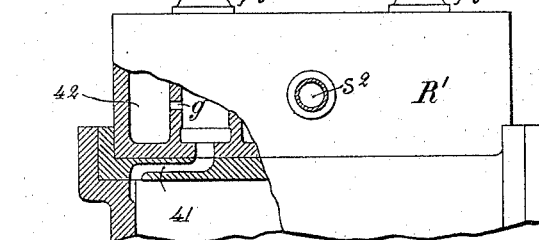
WITNESSES:
Fred White
Thomas F. Wallace
INVENTORS:
Francis G. Bates and Frank H. Bates,
By their Attorneys,

UNITED STATES PATENT OFFICE.

FRANCIS G. BATES AND FRANK H. BATES, OF PHILADELPHIA, PENNSYLVANIA.

MOTOR-ENGINE.

SPECIFICATION forming part of Letters Patent No. 580,445, dated April 13, 1897.

Application filed December 15, 1896. Serial No. 615,762. (No model.)

*To all whom it may concern:*

Be it known that we, FRANCIS G. BATES and FRANK H. BATES, citizens of the United States, and residents of Philadelphia, in the county of Philadelphia and State of Pennsylvania, have invented certain new and useful Improvements in Motor-Engines, of which the following is a specification.

This invention relates most particularly to gas-engines of that type in which the cylinders are fed with compressed gas and compressed air, both preferably heated, which commingle in the cylinders, are ignited, and by their expansion generate the power which propels the piston. An example of such an engine is disclosed in the patent of M. Lorois, No. 529,452, granted November 20, 1894, which illustrates the engine in connection with a gas-producer and air-compressor for supplying the required gas and compressed air for constituting a complete power plant.

Our invention provides certain improvements adaptable to engines of this character and relating especially to the valves and valve-gear as well as to other features of the engine. The valves and valve-gear are, however, applicable with other types of motor-engines, such as steam-engines.

In the accompanying drawings we have shown a two-cylinder engine embodying our invention.

Figure 1:
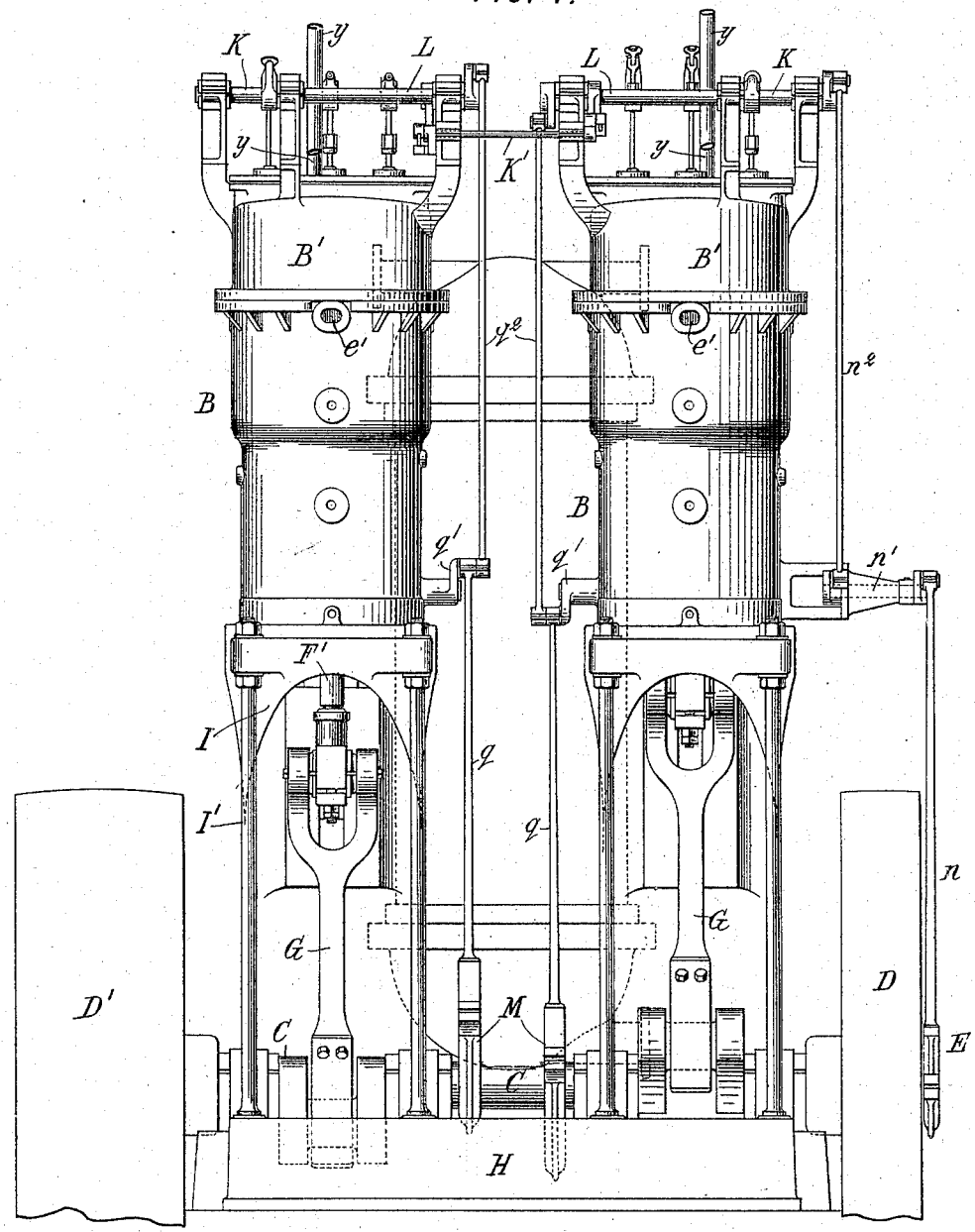
Figure 13:
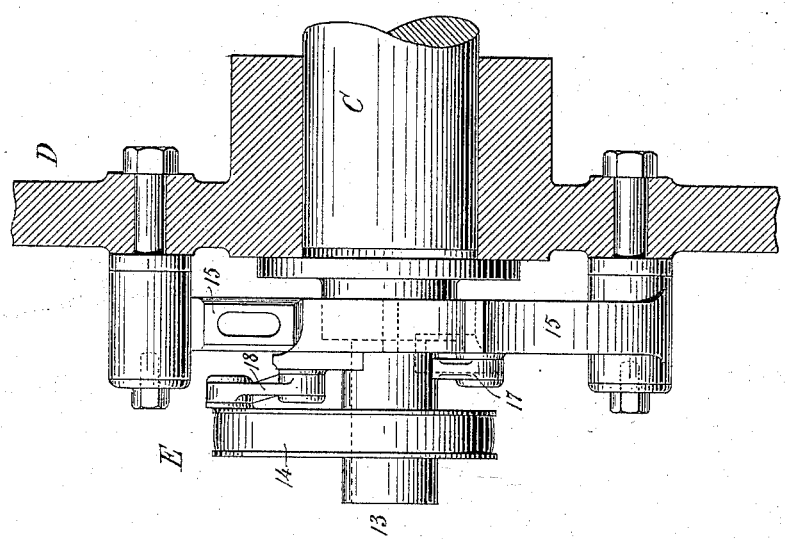
Figure 12:
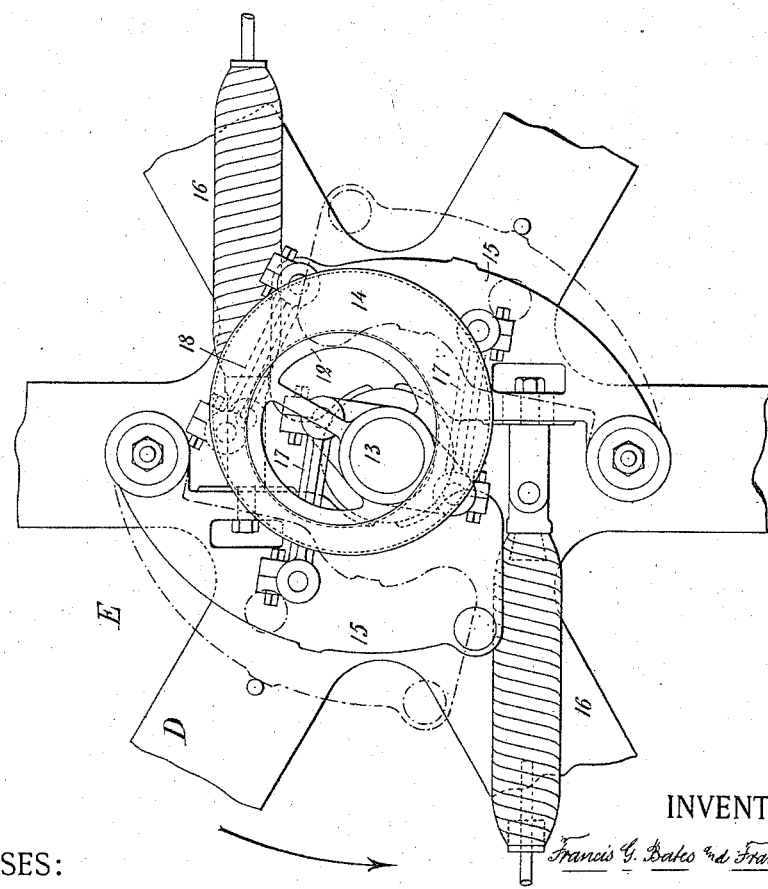

Figure 1 is a front elevation of the engine. Fig. 2 is a side elevation thereof, Figs. 2ª and 2ᵇ showing details which are not apparent in the main figure. Fig. 3 is a plan of the cylinder-heads and valve-gear. Fig. 4 is a horizontal section through the left-hand cylinder-head on the line 4 4 in Fig. 6. Fig. 5 is a vertical mid-section of the left-hand cylinder viewed from in front, the section being on the lines 5 5 in Figs. 3 and 4. Fig. 5ª is a fragmentary section answering to a portion of Fig. 5 when the piston is at the bottom of its stroke. Fig. 6 is a vertical transverse section on the lines 6 6 in Figs. 3 and 4. Fig. 6ª shows one of the valve-operating arms removed, partly in section. Fig. 7 is a transverse section of the main piston. Figs. 8 and 9 show the exhaust-valve in cross-section and vertical mid-section, respectively. Figs. 10 and 11 show the air-inlet valve in transverse section and vertical mid-section, respectively. Fig. 12 is a side elevation of the eccentric-governor, the eccentric-strap being removed. Fig. 13 is a rear elevation of the governor, the hub of the fly-wheel being in section. Figs. 14 to 16 show the application of our improved valve and gear to a steam-engine, Fig. 14 being a plan, Fig. 15 a sectional side elevation, and Fig. 16 a transverse section on line 16 16.

Referring to the gas-engine shown in Figs. 1 to 13, inclusive, we have not in the drawings shown the apparatus for producing the gas by which the engine is driven, as our invention has no relation thereto. For a full understanding of the connected apparatus, by which the air is compressed and heated, steam is generated and superheated, the heated air and superheated steam are commingled and passed through the producer or "gazogene," containing a bed of incandescent fuel, whereby they are converted into a producer-gas, and this gas is conducted to the engine-cylinders through one conduit, while heated compressed air is admitted to them through another conduit, the public is referred to the said Lorois patent. The only portion of such apparatus shown in the drawings is the air heater or regenerator A, which is mounted on the same base as the engine. Its function is to receive the hot gases exhausted from the engine-cylinders and by circulating them around tubes through which compressed air is flowing to transfer the heat from the waste gases to the compressed air.

Referring to Figs. 1 to 13, let B B designate the respective engine-cylinders; C, the crank-shaft; D, the fly-wheel; D', the belt-pulley, and E the governor. The cranks are one hundred and eighty degrees apart, the two cylinders being single-acting and open at the lower end. Three or four cylinders might, however, be used instead of two, with a corresponding rearrangement of the crank-angles. The pistons F, one of which is shown in Fig. 5, are connected by piston-rods F' to cross-heads sliding against guides and joined to pitmen or connecting rods G G, which connect with the cranks, all in the same manner, generally speaking, as in single-acting steam-engines. The crank-shaft turns in bearings of suitable construction, which are mounted upon a base H, and upon this base are mounted inclined standards or housings I I, the front sides of which are strengthened by pillars I' I', and on these supports are mounted the cylinders B B. The tops of the cylinders are closed by hollow cylinder-heads B' B', within which are provided the valves and above which are mounted the valve-operating mechanisms which derive motion from eccentrics on the crank-shaft.

Referring particularly to Fig. 5, let $a$ indicate the air-chest and $b$ the gas-chest. In each is formed an upright cylindrical valve-chamber $a'$ and $b'$, respectively, in which chambers move piston-valves, the air-inlet valve being lettered $c$ and the gas-inlet valve $d$. These valves are constructed as pistons connected to rods or valve-stems $c'$ and $d'$, respectively, which pass out through stuffing-boxes at the top of the chambers and are guided by cross-heads $c^2$ $d^2$, respectively, which work between guides $e$ $e$, Fig. 6, fixed to the top of the cylinder-head. The cross-heads are connected by links $f$ $f$ to adjustable lever-arms J, keyed on a rock-shaft K, Fig. 6. The oscillating of the shaft K moves both gas and air inlet valves together, and whenever these valves are raised so that their lower piston portions pass above the inlet-ports $g$ $g$ gas and air pass from the respective chests into the valve-chambers beneath the valves, flow thence into a chamber or passage $h$ beneath, and from this through an aperture into a chamber $i$, divided by a perforated partition $j$, so arranged as to cause a circuitous flow of the gas and air for the purpose of mixing them, whereupon they are admitted through an opening $k$ into the cylinder. For balancing the piston-valves ports or passages $m'$ $m'$ are provided, admitting the gas or air pressure to pass through the valves from the lower to the upper ends thereof, whereby the pressures upon the opposite ends of the pistons are equalized except to the extent of the area of the valve-stems. The construction of the air-valve $c$ is shown in detail in Figs. 10 and 11, the construction of the gas-valve being identical therewith, except that it is preferably of smaller diameter.

The inlet-valves are operated by means of a governor E, which is a double-eccentric governor of known type, the eccentric-strap connecting by a rod $n$ either directly with the shaft K or, preferably, through the medium of a rock-shaft $n'$, having bearings in a bracket projecting from one of the cylinders and having crank-arms on its opposite face, to one of which the rod $n$ is connected and to the other of which is connected a secondary rod $n^2$, the upper end of which connects with an arm on the shaft K. This shaft extends horizontally over the top of the cylinder-head, being mounted in bearings formed on brackets mounted thereon. The shafts K for both cylinders are alike, but inasmuch as the cranks corresponding to the cylinders are located one hundred and eighty degrees apart it is necessary that the two shafts K shall have opposite movements, and to this end provision is made for communicating oscillatory movements from one shaft K to the other in such manner as to reverse the movement, so that when the valves of one cylinder are opened those of the other shall be closed, and vice versa. The shaft K, which is driven by the governor, is provided with an arm $o$, which is connected by a link $p$, Fig. 2$^a$, to a downwardly-projecting arm on an intermediate shaft K', which has an upwardly-projecting arm at its other end which connects by a link $p'$ with a downwardly-projecting arm $o'$ on the shaft K of the left-hand cylinder, all as clearly shown in Figs. 3 and 2$^a$. Thus the two shafts K K oscillate simultaneously in contrary directions.

Each cylinder is provided with an exhaust-valve $r$, working in a valve-chamber $s'$, which communicates through exhaust-ports $t$ with the exhaust chest or passage $s$. The exhaust-valve $r$ is constructed as a piston or plunger mounted on a rod or stem $r'$, which passes up through a stuffing-box in the cylinder-head and carries on its upper end a cross-head $r^2$, which, like the other cross-heads, is guided by uprights $e$ $e$. It is also in like manner connected by a link $f$ to an arm J', which may be a counterpart of the arm J and which is fixed on a separate horizontal shaft L, mounted in suitable bearings above the cylinder-head. Each of the rock-shafts L is driven from a separate eccentric M, fixed on the main shaft, the mode of communicating motion being indicated in Fig. 2$^b$, where the eccentric-strap connects by a rod $q$ to a guide-arm $q'$, where it is jointed to a second rod $q^2$, the upper end of which is jointed to an arm fixed on the shaft L. In lieu of two eccentrics M, one for operating the exhaust of each cylinder, a single eccentric might be substituted with a reverse-gear interposed for communicating movement from one of the shafts L to the other, similarly to the arrangement shown for communicating movement from one shaft K to the other; but as the eccentrics M are eccentrics set once for all, and as it is desirable to set them independently of each other, it is preferable to employ the construction shown.

The preferred construction of the exhaust-valve $r$ is shown in Figs. 8 and 9. It is a cylinder having packing-rings near its upper and lower ends and is balanced by having passages $t$ $t$ formed through its upper and lower plates and communicating with its hollow interior, so that the pressure can pass from the cylinder through the valve to the chamber above it, thereby equalizing the pressure on its opposite ends, except to the extent due to the area of the stem $r'$, which necessarily remains unbalanced.

The operation of the valve mechanism will be apparent.

The eccentric-governor E determines the movements of the two inlet-valves of each cylinder, while the fixed eccentric M moves the exhaust-valve. The exhaust-valve, which is opened during the upstroke of the piston, closes at the upper end of this stroke, or preferably just before, in order to effect a slight cushioning, and at or just before the beginning of the downstroke the inlet-valves begin to open, opening either simultaneously or one slightly in advance of the other, so that the compressed air and gas enter the cylinder, and being presently ignited therein burn and expand as the piston moves downward, until at a suitable point in the stroke the inlet of air and gas is cut off by the closing of the inlet-valves, whereupon the remaining stroke of the piston is performed under the pressure due to the expansion of the burning gas in the cylinder. The indicator-card closely approximates to that of a steam-engine operating expansively, the pressure continuing to fall until the piston reaches the bottom of its stroke, whereupon the exhaust-valve opens and the burned gases escape through the exhaust. These waste gases are very hot and are conducted from the passage $s$, Fig. 4, through pipes $s^2$, Fig. 2, to the regenerator A, in which their heat is given up almost entirely to the inflowing compressed air.

The engine is governed by varying the point of cut off of the inflowing gas and air, just as a steam-engine is governed by varying the cut off of the steam. This is effected by the governor E, which is in itself of a construction known and common in steam-engines. It is shown in Figs. 12 and 13. In the particular construction shown it comprises an inner eccentric 12, turning freely on a stud 13, fixed to the hub of the fly-wheel concentrically with the axis of the crank-shaft, and an outer eccentric 14, turning upon the eccentric 12. Two pivoted weights or weighted levers 15 15, drawn toward the center by springs 16 16, are connected by links 17 17 to the inner eccentric, and one of them is connected by a link 18 to the outer eccentric, the connections 17 and 18 being, however, relatively reversed, to the effect that when the weights fly out under centrifugal force they cause the inner eccentric to turn forward relatively to the crank-shaft, while at the same time the outer eccentric is caused to turn backward. The result is that the center of the outer eccentric is displaced both forwardly and inwardly, so that while the lead of the outer or effective eccentric is increased its throw is decreased. The result of the decreased throw is that the inlet-valves are lifted to a less height, thereby reducing the number of degrees in the revolution of the crank-shaft during which these valves remain open, while the result of increasing the lead of the eccentric is that the upward movement imparted to the valves, by which they are opened, occurs at an earlier point in the stroke, thereby neutralizing the delayed opening of the valves which would otherwise result from their decreased lift.

The result is that at any speed the valves may with a given adjustment open at approximately the same point in the stroke, the variations in both lead and extent of movement combining to vary the point at which cut off shall take place. The effect on the valves may be greatly varied by varying the proportions of the eccentrics and their relative adjustment. We have, however, devised a more simple and easily-applied means of effecting any required adjustments of the valves, which we will now describe.

Each valve-operating arm or lever J is constructed in two parts in such manner that its radius where it connects with the link $f$ may be adjustable. The main part of the lever is formed with a neck $u$, which when the lever is in its lowest position, as shown in Fig. 6, stands preferably horizontally. On this neck slides a yoke $u'$, which may be fastened in any position within certain limits by means of a set-screw $u^2$, Fig. 6$^a$, the lower end of this yoke being formed with an eye which makes pivotal engagement with the link $f$. By setting the yoke nearer to or farther from the shaft K the effective radius of the lever is altered to an extent which, with the proportions shown, comes within the limitations of the dotted arcs in Fig. 6$^a$. By comparing the different levels at which the upper ends of these arcs terminate it will be seen that this adjustment varies the height to which the valve will be lifted. Other mechanical constructions for accomplishing the same result may be substituted to equivalent effect, our invention not being limited to the particular mechanical construction shown. All that is essential is that the throw of the valve with a given angle of oscillation of the rock-shaft may be variable by adjustment. To this end the most convenient means is to provide a lever-arm the effective length or radius of which is adjustable. This adjustment should preferably not affect the position of the valve when at the bottom of its stroke, except to the immaterial extent due to the varying angularity of the intervening link $f$, if such be used. Hence the adjustment of the effective length of the arm has the effect of varying the lift of the valve, and consequently the speed at which it travels, and hence the point in the stroke at which in ascending it uncovers the inlet-ports, and also the time during which these ports are left uncovered. For example, assuming the lever-arm to be set at the shortest effective length, the valve has a certain minimum travel from its lowest position to its highest and moves at the minimum speed, thus uncovering its inlet-ports at a late point in its upstroke, and then recovering them at an early point in its downstroke, while by setting the arm to a greater effective radius the valve (starting, for example and preferably, from approximately the same point at bottom stroke) has a maximum lift, rising to a higher point in equal time and hence moving more rapidly, so that it uncovers its inlet-ports at an earlier point in its upstroke and recovers them at a later point in its downstroke, so that the duration of opening of the ports is greatly prolonged. In the construction shown the proportions are such that the variation in duration of port-opening is in the ratio of one hundred to one hundred and fifty in the two extreme adjustments stated. Other proportions are admissible, however. Further, the proportions may be such that the minimum lift of either inlet-valve will not wholly uncover the inlet-ports, thus giving a minimum area of inflow at the top stroke of the valve, while by setting the arm to longer radius the higher lift of the valve will uncover more of the ports, and at extreme radius the valve at top stroke will leave the ports fully uncovered. This valve adjustment is wholly independent of the operation of the governor. By means of this adjustment not only may the duration of opening of either valve be varied, but also the air and gas valves may be adjusted relatively to one another, so that either one may open ahead of and close after the other. The exhaust-valve is also rendered adjustable by constructing its lever $J'$ to be extensible in the same manner.

Our improved valve motion has the advantage of substituting continuously moving or sliding piston-valves in place of the puppet-valves operated by a tappet motion heretofore used in engines of this class. These piston-valves operate smoothly and noiselessly without shock or chattering, and being approximately balanced are moved with the utmost ease, require no strong or heavy mechanical parts to operate them, and require no perceptible power for driving them. They also facilitate the application of the cut-off principle to engines of this type, which can be but imperfectly accomplished by puppet-valves.

A further feature of our invention, applicable particularly to gas-engines, is shown best in Figs. 5, 10, and 11. The inlet-valves $c$ and $d$ are made as double-piston valves, with a chamber $m$ between the two piston portions of the valves. In addition to the main inlet-ports $g$ supplemental ports $l$ are provided at a higher point, so that when the ports $g$ are first opened during the upward movement of the valve the ports $l$ come into communication with the intermediate chamber $m$. Hence as pure gas or air is admitted beneath the valve to enter the cylinder pure gas or air is also admitted through the ports $l$ into the chamber $m$, and thence upwardly through balancing-ports $m'$ $m'$ into the upper part of the valve-chamber above the valve. This construction insures that only pure gas shall be admitted above the gas-valve and only pure air above the air-valve, and avoids the possibility of an explosive mixture finding its way up through the balancing-ports into the valve-chamber above these valves, as might occur if the gas or air passing through the valve were taken wholly from the space beneath the valve, in which space some admixture of gas and air is liable to occur. We also construct these valves with a hollow space or chamber $m^2$ beneath the intervening chamber $m$, so that as the valve descends, and consequently a relatively upward current of gas or air passes through it, the gas or air from beneath the valve first enters the chamber $m^2$ and cannot pass into or beyond the chamber $m$ until it has practically filled this chamber $m^2$ and displaced therefrom the pure air or gas which previously entered this chamber by a downward circulation from the ports $l$ and chamber $m$. During the subsequent upward movement of the valve the air or gas circulates downwardly through the ports $m'$, and any admixture of air or gas which may have found its way into the chamber $m^2$ is expelled by the admission of pure air or gas through the ports $l$ and chamber $m$ into this chamber $m^2$. It results from these constructions that only gas or air so pure as to be safe from any liability of forming an explosive mixture can ever be admitted to the valve-chamber above the valve, this precaution being desirable because the temperature of the valve-chests during prolonged running of the engine becomes so high as to involve some danger of ignition of an explosive mixture if the latter should be present in the contracted chambers above the valves.

In all combustion-engines the cylinders require water-jacketing to keep them cool.

Referring to Fig. 5, the cylinder B is made, as usual, with double walls, with the addition of a transverse partition $v$, whereby the jacket is divided into a cold-water jacket P and a hot-water or steam-generating jacket P'. The former receives cold water through an opening $w$ and discharges it slightly warmed through an opening $w'$, the purpose of this jacket being to keep the lower portion of the cylinder which is traversed by the packing-rings on the piston so cool as to permit of effective lubrication. The upper jacket P' receives water at its bottom through a tube or opening $w^2$, this water being preferably a portion of the water already warmed in the lower jacket, although any other source of warm or hot water will answer. The upper portion of the cylinder is constructed with openings $x$ at intervals, one of them being shown in Fig. 6 and others in Fig. 4; these openings communicating with coinciding openings in the bottom of the cylinder-head B' and commucating with a jacket $P^2$ therein. The water-level is maintained in this jacket $P^2$, so that the upper portion thereof forms the steam-dome of the generator, from which steam is taken off by pipes $y$ $y$, Fig. 3. It will be observed from Fig. 4 that the jacket $P^2$ is divided by the valve-chambers into two distinct portions. Hence the necessity for carrying off two steam-pipes $y$ $y$.

Each cylinder-head B' is formed with two vertical cylindrical cavities, the one a relatively small one for receiving the exhaust-valve chest and the other a relatively large one for receiving the inlet-valve chest. The exhaust-valve chest Q is constructed as a cylindrical casting formed with the valve-chamber $s'$ within it, and around this a jacket constituting the exhaust-space $s$, while its bottom portion is constructed with an eccentric projection, through which is formed a passage $s^2$, leading to within the cylinder. The inlet-valve chest R is likewise a cylindrical casting, large enough, however, to include the valve-chambers $a'$ $b'$ for both the air and gas valves. Around these two chambers are formed the annular gas and air spaces $a$ $b$, Fig. 4, communicating with the air and gas inlet passages. The space not occupied by these chambers and passages constitutes cavities $y'$ $y'$, which may either be left as dead-air spaces or may be packed with asbestos or other non-conductor of heat; or, in any case, if it be considered that the valve-chambers require cooling these cavities may be utilized for circulation of water or steam. The exhaust and inlet chests Q and R are machined on their lower faces to make a tight fit with the bottoms of the respective cavities in the cylinder-head and are held down by a double-rimmed cap-plate S, having flanges entering around the respective chests for confining packing material around them to form stuffing-boxes.

By referring to Fig. 4 it will be seen that the water and steam spaces $P^2$ partially surround the respective exhaust and inlet chests, and hence serve to prevent overheating, it being desirable that the air and gas which enter in a heated condition shall not be cooled, while, on the other hand, the metal parts shall not become unduly heated from the combustion occurring within the cylinder.

The piston F is constructed as shown in Figs. 5 and 7. The portion containing the packing-rings projects wholly below the upper portion or body of the piston, which is made hollow and is connected to the piston-rod F' by being bored through concentrically and having a rod passed through it and preferably tapered, a nut being screwed down on the threaded end of the rod to hold it in place. Over the piston-body is fitted a plate $z$, of nickel or some other metal, which becomes incandescent at the temperature of combustion within the cylinder, a similar plate $z'$ being fitted as a lining beneath the cylinder-head. These two plates become heated to incandescence shortly after the engine is started, and serve by their incandescence to ignite the mixed air and gas which enters between them. When first starting the engine, an electric igniter is used, as indicated at T in Fig. 5, but after the plates $z$ $z'$ become sufficiently heated this igniter becomes unnecessary. The plate $z$ is fastened upon the piston by three bolts $z^2$, passing through the body of the piston, and having nuts screwed upon their lower ends, as shown in Figs. 5 and 7. This construction leaves more space at the lower end of the piston than heretofore and requires fewer bolts and nuts for fastening the parts together. For lubricating the piston an annular oil vessel U is provided, as heretofore, which receives oil from the exterior oil-cup U' through a communicating passage. When the piston reaches the bottom of its stroke, its flange, which is reduced nearly to a thin edge, plunges into the oil, and as it reascends it carries up a portion of oil in an exterior groove and distributes this oil upon the surface of the cylinder. Difficulty has heretofore been experienced by reason of the splashing of the oil, and a sharp vibratory noise accompanying each stroke, due, as we believe, to the compression of air within the upper portion of the oil-receptacle U by the descent of the piston-flange into it. To avoid this, we not only form the flange thinner below the packing-rings, but we provide holes $x'$ at intervals through the rim of the oil vessel.

Near the top of the cylinder B are formed four openings, three of which are shown in Fig. 5. These openings are fitted, respectively, with, first, an igniter; second, a blow-off cock or safety-valve; third, a peep-hole or eye-sight, and, fourth, an indicator connection.

In Fig. 5 the igniter T is shown at the right and the indicator connection V is shown at the left. The front holes $e'$, Fig. 1, are preferable fitted with peep-windows, and the corresponding rear holes are provided with the safety-valves.

That part of our invention which relates to the construction of the valves and the valve-gear is not limited in its application to gas-engines, but is equally applicable, with appropriate modifications, to other motive engines. In Figs. 14 to 16 we have shown it as applied to a steam-engine, wherein B' is the cylinder, R' is the valve-chest, $a^2$ is the steam-admission, $s^2$ is the exhaust-pipe, $d^3$ $d^3$ are the inlet-valves, and $r^3$ $r^3$ are the exhaust-valves. The inlet and exhaust valves are piston-valves of the same construction as the exhaust-valve shown in Figs. 8 and 9. They work in cylindrical chambers formed in the valve-chest R', as clearly shown, being attached to stems which pass out through stuffing-boxes in the top of this chest and which are operated by rock-shafts in the same manner as the valves in the gas-engine already described. The valve-stems are connected by links $f$ to the lifter-arms J J for the inlet-valves, and J' J' for the exhaust-valves. The arms J are mounted on rock-shafts $K^2$, having suitable bearings, and which are connected to oscillate together by means of parallel crank-arms connected by a parallel connecting-rod 33. One of the shafts $K^2$ is oscillated from the governor by a rod 34, connecting therewith, pivoted to an arm 35 on the shaft. Thus the governor controls the oscillation of the inlet-valve shafts K². The exhaust-valve lifter-arms J' J' are mounted on shafts L², which are connected together by crank-arms and a parallel bar 36, and one of them has an arm 37, which is connected by a rod 38 to the exhaust-eccentric. If preferred, there might be two exhaust-eccentrics, each connected to the corresponding one of the shafts L², as already described with reference to the gas-engine. The governor and exhaust-eccentrics are or may be fixed on the crank-shaft in the manner common with reciprocating double-acting steam-engines. The steam entering at $a^2$ circulates in the steam-chest 39 and passes by ports $g$ whenever these ports are uncovered by the inlet-valves, flowing thence through the cylinder-ports 40 to the cylinder. The exhaust escapes by similar ports 41 to the exhaust-valve chamber and thence by ports $t$ to the exhaust-chest 42, whence it passes out by the exhaust-pipe $s^2$.

As applied to a steam-engine our valve system has the advantage of the Corliss engine in securing an effective distribution of steam with the separate location of inlet and exhaust valves, ports, and chests, so that the exhaust-steam, which is much cooler than the live steam, does not chill the latter. It has the further advantage over the Corliss engine that the valve motion is much simpler, there being no trip motion, no dash-pots, and a much simpler arrangement of connecting parts, while the motion of the valves is continuous and positive, the valves closing without shock and the valve-gear being independent of any speed limitation, so that it is applicable as well to high-speed engines as to those running at the comparatively low speed to which the Corliss type of engine is limited. The same means for adjusting the effective radius of the arms J J' which we have already described is applied in connection with steam-engines, and has similar advantages as in gas-engines in enabling a perfect adjustment of the duration and extent of opening to be made with great facility.

What we claim is—

1. In an engine, a piston-valve having balancing-ports through it, and a cylindrical valve-chamber in which said valve moves, communicating at one end with the engine-cylinder, formed with ports through its side wall to be uncovered by said piston-valve in its movement, and mechanism for moving said valve, adapted to impart movements of varying extent to the valve, whereby to vary the duration of opening of said ports.

2. In an engine, the combination of a valve constructed as a piston moving in a cylindrical valve-chamber having lateral ports, an oscillating shaft, an eccentric connected to oscillate said shaft, an arm on said shaft for engaging said valve, and an adjustable connection between said arm and valve adapted to vary the position of the valve with relation to said shaft.

3. An engine valve-gear, comprising a longitudinally-moving valve, an oscillating shaft, and an arm on said shaft, connected to the valve and adjustable in effective radius to vary the throw imparted to the valve with a given movement of the shaft.

4. The combination with a valve and an oscillating valve-shaft, of an arm J on said shaft having a neck $u$, and a yoke-piece $u'$ adjustable on said neck, with means for fastening it thereto.

5. An engine valve-gear comprising inlet and exhaust piston-valves, having balancing-ports through them, valve-chambers in which said valves move, inlet and exhaust chests inclosing said chambers, ports in the sides of said chambers communicating with said chests, to be uncovered by the valves in their movement, said chambers each communicating at one end with the engine-cylinder, and mechanism for moving said valves independently of one another, adapted to vary the extent of movement of the inlet-valve to thereby vary the duration of admission.

6. In a gas-motor engine, an inlet-valve constructed as a double piston with an intervening chamber $m$, and with balancing-ports through the valve, combined with a valve-chamber having inlet-ports $g$ and supplemental inlet-ports $l$, the latter arranged to communicate with said chamber $m$ when the ports $g$ are opened by the valve.

7. In a gas-motor engine, an inlet-valve constructed as a double piston with an intervening chamber $m$, with a hollow space $m^2$ beneath it, and with balancing-ports affording communication from end to end of the valve, combined with a valve-chamber having inlet-ports $g$ and supplemental inlet-ports $l$, the latter arranged to communicate with said chamber $m$ when the ports $g$ are opened by the valve.

8. In a gas-motor engine comprising air and gas inlet valves and an exhaust-valve, a valve-movement consisting of an oscillating shaft extending transversely to the movement of said valves, arms on said shaft engaging the respective inlet-valves, an eccentric on the crank-shaft, and connections for oscillating said shaft, an exhaust-eccentric, and connections therefrom to the exhaust-valve.

9. In a gas-motor engine comprising air and gas inlet valves and an exhaust-valve, a valve-movement consisting of an oscillating shaft extending transversely to the movement of said valves, arms on said shaft engaging the respective inlet-valves, a variable eccentric-governor on the crank-shaft connected to oscillate said shaft and adapted to vary the throw of the eccentric with variations in speed, whereby the oscillating shaft is driven with an oscillating movement of varying extent, an exhaust-eccentric fixed on said crank-shaft, and mechanical connections between the latter and the exhaust-valve.

10. In a gas-motor engine, the combination of a cylinder having air and gas inlet valves and an exhaust-valve, said valves constructed as pistons sliding in cylindrical valve-chambers having lateral ports, eccentrics on the crank-shaft, and mechanical connections for imparting motion from the eccentrics to the respective valves, whereby the latter are given continuous reciprocatory movements.

11. In a gas-motor engine, the combination of a cylinder having air and gas inlet valves and an exhaust-valve, said inlet-valves constructed as approximately balanced pistons moving in cylindrical valve-chambers formed with lateral ports, a variable eccentric-governor on the crank-shaft adapted to vary the throw of the eccentric with variations in speed, and mechanical connections between said governor and the inlet-valves, whereby said valves are continuously reciprocated and are moved to a varying extent beyond said ports with variations in speed to thereby vary the duration of opening of the ports.

12. In a two-cylinder engine, the combination of inlet and exhaust valves, a transverse shaft K for each cylinder connected to said inlet-valves, an eccentric-governor connected to one of said transverse shafts, and a reverse connection for transmitting oscillatory movement from one shaft K to the other, whereby the second shaft is caused to oscillate in the contrary direction from the first shaft.

13. In a two-cylinder engine, the combination with the inlet-valves of the respective cylinders, of a valve-operating rock-shaft K for each cylinder, an eccentric-governor E connected to one of said shafts, an intervening rock-shaft K′, crank-arms on the respective shafts K and on said intervening shaft, and links connecting the respective crank-arms, said arms being so arranged relatively that reverse movement is communicated from one shaft K to the other through the intervening shaft and links.

14. In a gas-motor engine, a cylinder having a jacketed head and formed with cylindrical valve-chambers within it, with piston-valves movable in said chambers, and inlet and exhaust passages formed through said head and communicating with said chambers.

15. In a gas-motor engine, a cylinder having a steam-generating jacket extending into its head, and an exhaust-valve chamber formed in said head and surrounded by said jacket, whereby the heat of the exhaust is utilized for generating steam, and the exhaust-valve chest is kept from overheating.

16. In a gas-motor engine, a cylinder-head formed with cavities adapted to receive valve-chests, and valve-chests inclosing the respective valves fitted in said cavities, the space within said head not occupied by said cavities being formed as a steam-generating jacket.

17. In a gas-motor engine, a cylinder-head formed with two cavities, one adapted to receive an exhaust-valve chest and the other adapted to receive an inlet-valve chest, combined with the exhaust-valve chest formed with a chamber for the exhaust-valve, and the inlet-valve chest formed with two chambers, one for the gas-inlet valve and the other for the air-inlet valve, with lateral passages from said chests, and communicating passages formed laterally through said head for the flow of gas, air and exhaust-gases.

18. In a gas-motor engine, a power-cylinder having gas and air inlet valves movable in valve-chambers formed in the cylinder-head, said chambers united by a passage $h$ and communicating through an opening with a chamber $i$ separated from the combustion-chamber of the cylinder by a plate having opening $k$, and with an intercepting partition $j$ dividing said chamber, and having circumferential perforations adapted to cause a circuitous flow of the incoming gas and air in order to perfect a thorough admixture thereof.

19. In a gas-motor engine, the combination with a power-cylinder having an annular oil vessel U, a power-piston F having a pendent flange adapted to dip into the oil in said vessel, and said vessel formed with perforations $x'$ for circulation of air.

In witness whereof we have hereunto signed our names in the presence of two subscribing witnesses.

FRANCIS G. BATES.
FRANK H. BATES.

Witnesses:
 FRANCIS J. SCANLAN,
 JOHN J. MINNICK.